US009947267B2

(12) United States Patent
Qing et al.

(10) Patent No.: US 9,947,267 B2
(45) Date of Patent: Apr. 17, 2018

(54) LIGHT EMITTING DIODE PIXEL UNIT CIRCUIT AND DISPLAY PANEL FOR LIGHT EMITTING DIODE DISPLAY

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Haigang Qing, Beijing (CN); Xiaojing Qi, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 307 days.

(21) Appl. No.: 14/371,503

(22) PCT Filed: Aug. 7, 2013

(86) PCT No.: PCT/CN2013/081022
§ 371 (c)(1),
(2) Date: Jul. 10, 2014

(87) PCT Pub. No.: WO2014/190617
PCT Pub. Date: Dec. 4, 2014

(65) Prior Publication Data
US 2016/0225313 A1  Aug. 4, 2016

(30) Foreign Application Priority Data

May 29, 2013  (CN) .......................... 2013 1 0205666

(51) Int. Cl.
*G06F 3/041* (2006.01)
*G09G 3/32* (2016.01)
(Continued)

(52) U.S. Cl.
CPC ........... *G09G 3/3233* (2013.01); *G06F 3/044* (2013.01); *G06F 3/0412* (2013.01);
(Continued)

(58) Field of Classification Search
CPC .. G09G 3/3233; G09G 3/2007; G09G 3/3266; G09G 2300/0819;
(Continued)

(56) References Cited

U.S. PATENT DOCUMENTS

2004/0026723 A1  2/2004  Miyazawa
2009/0284511 A1  11/2009  Takasugi et al.
(Continued)

FOREIGN PATENT DOCUMENTS

CN  1482586 A  3/2004
CN  102646386 A  8/2012
(Continued)

OTHER PUBLICATIONS

Dec. 1, 2015—International Preliminary Report on Patentability Appn PCT/CN2013/081022.
(Continued)

*Primary Examiner* — Lisa Landis
(74) *Attorney, Agent, or Firm* — Banner & Witcoff, Ltd.

(57) ABSTRACT

A LED pixel unit circuit and a display panel. The LED pixel unit circuit comprises a driving module (31), the driving module (31) includes a driving TFT (DTFT), a first-switching element (T1), a first capacitor (C1), a second capacitor (C2) and a driving control unit (311), wherein the driving control unit (311) comprises a matching TFT (T3) whose threshold voltage (Vth3) is matched with the threshold voltage (Vth) of the driving TFT (DTFT), is located between the positive voltage (VDD) output terminal of the power source and the first node (P1), and is configured to control charging and discharging of the second capacitor (C2) so as
(Continued)

to hold the threshold voltage (Vth3) of the matching TFT (T3) and thereby compensate for the threshold voltage (Vth) of the driving TFT (DTFT). The LED pixel unit circuit can solve the problem of brightness non-uniformity of the display panel due to different threshold voltages of the TFTs, and also integrate a touch screen circuit (32) into the pixel unit circuit to realize a touch function of the display panel.

18 Claims, 4 Drawing Sheets

(51) Int. Cl.
    *G09G 3/3233*     (2016.01)
    *G06F 3/044*     (2006.01)
    *G09G 3/20*     (2006.01)
    *G09G 3/3266*     (2016.01)

(52) U.S. Cl.
    CPC ......... *G06F 3/0416* (2013.01); *G09G 3/2007* (2013.01); *G09G 3/3266* (2013.01); *G09G 2300/0819* (2013.01); *G09G 2300/0852* (2013.01); *G09G 2310/0251* (2013.01); *G09G 2310/0262* (2013.01); *G09G 2320/0233* (2013.01); *G09G 2320/043* (2013.01); *G09G 2320/045* (2013.01); *G09G 2354/00* (2013.01)

(58) Field of Classification Search
    CPC ..... G09G 2310/0251; G09G 2320/045; G09G 2354/00; G06F 3/0412; G06F 3/0416; G06F 3/044
    USPC ......................................................... 345/173
    See application file for complete search history.

(56) References Cited

U.S. PATENT DOCUMENTS

2010/0127955 A1* 5/2010 Choi ................... G09G 3/3233
    345/76
2012/0028710 A1   2/2012 Furukawa et al.
2014/0139502 A1* 5/2014 Han ................... G09G 3/3233
    345/212

FOREIGN PATENT DOCUMENTS

| CN | 102654973 A | 9/2012 |
|---|---|---|
| CN | 102682704 * | 9/2012 |
| CN | 102682704 A | 9/2012 |
| CN | 102708791 A | 10/2012 |
| CN | 103310729 A | 9/2013 |
| CN | 203242307 U | 10/2013 |
| CN | 203325408 U | 12/2013 |
| WO | 9848403 A1 | 10/1998 |

OTHER PUBLICATIONS

PCT International Search Report for PCT/CN2013/081022, dated Feb. 27, 2014; 14 pages.
First Office Action from the State Intellectual Property Office of the People's Republic of China for Chinese Patent Application No. 201310205666.6, dated Nov. 2, 2014; 6 pages.
English Translation of First Office Action from the State Intellectual Property Office of the People's Republic of China for Chinese Patent Application No. 201310205666.6, dated Nov. 2, 2014; 6 pages.
English Abstract of CN103310729A; 1 page.
English Abstract of CN203242307U; 1 page.
English Abstract of CN203325408U; 1 page.
English Abstract of CN102682704A; 1 page.
English Abstract of CN102708791A; 1 page.
English Abstract of CN102646386A; 2 pages.
English Abstract of CN102654973A; 1 page.
English Abstract of CN1482586A; 2 pages.

* cited by examiner

LIGHT EMITTING DIODE PIXEL UNIT CIRCUIT AND DISPLAY PANEL FOR LIGHT EMITTING DIODE DISPLAY

CROSS REFERENCE TO RELATED APPLICATIONS

This application is based on International Application No. PCT/CN2013/081022 filed on Aug. 7, 2013, which claims priority to Chinese National Application No. 201310205666.6 filed on May 29, 2013. The entire contents of each and every foregoing application are incorporated herein by reference.

TECHNICAL FIELD OF THE DISCLOSURE

The present disclosure relates to the field of display technology, and particularly to a light emitting diode (LED) pixel unit circuit and a display panel.

BACKGROUND

Figure 1:
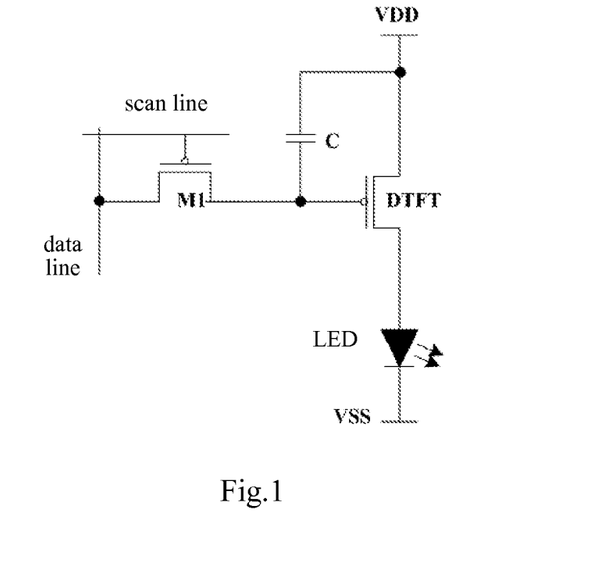
FIG. 1 is a 2T1C pixel driving circuit in the prior art.
Figure 2:
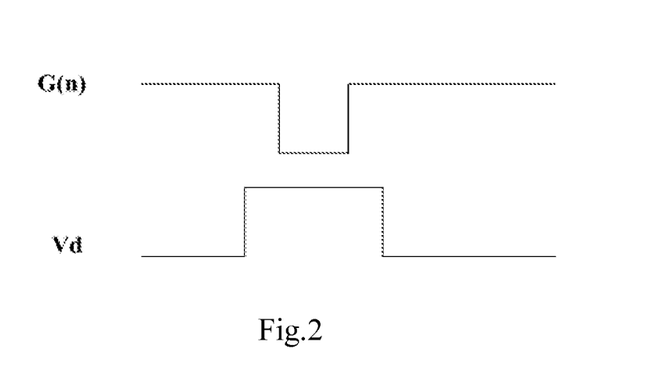
FIG. 2 is a timing diagram of signals at respective signal terminals of the 2T1C pixel driving circuit.

Compared with conventional liquid crystal panels, Active Matrix Organic Light Emitting Diode (AMOLED) display panels have many advantages such as high response speed, high contrast, wide visual angle, etc. The pixels of an AMOLED display panel are driven to emit light for displaying by related driving circuits on the array substrate. As shown in FIG. 1, a 2T1C pixel driving circuit in the prior art is shown. As can be seen from FIG. 1, the 2T1C pixel driving circuit in the prior art comprises two Thin Film Transistors (TFTs) and one capacitor, where the TFT M1 functions as a switch for controlling the connection between the data line and the gate of the TFT DTFT which is a driving TFT and can generate a driving current in the saturation state to drive the OLED to emit light. FIG. 2 is a timing diagram of the scan signal G(n) at the scan line and the gray-scale voltage signal Vd at the data line of the pixel driving circuit shown in FIG. 1. When the scan signal is at a low level, the TFT M1 is turned on and the gray-scale voltage Vd at the data line charges the capacitor C. When the scan signal is at a high level, the TFT M1 is turned off, the capacitor C is used to hold the gray-scale voltage. Since the positive voltage VDD of the power source is relatively high, the DTFT is at the saturation state. At this time, the driving current I of the OLED is:

$$I = K(Vsg - |Vth|)^2 = K(VDD - Vd - |Vth|)^2,$$

where Vsg is the gate-source voltage of the DTFT, Vth is the threshold voltage of the DTFT, VDD is the positive voltage of the power source, Vd is the gray-scale voltage at the data line, K is a constant related to the transistor size and the carrier mobility which is determined by the TFT size and process.

However, in practical production process, even if the same process parameters are used, the threshold voltages of TFTs at different positions of the produced display panel may have large difference, such that the critical saturation voltages of the TFTs at different positions are also different, and thus the driving currents for OLEDs under the same gray-scale voltage are different. Therefore, the brightness at different positions of the display panel adopting this circuit would be different, resulting in poor brightness uniformity.

SUMMARY

According to embodiments of the present disclosure, there are provided a LED pixel unit circuit and a display panel to solve the problem of brightness non-uniformity of the display panel due to different threshold voltages of the TFTs.

According to an embodiment of the present disclosure, there is provided a LED pixel unit circuit comprising a driving module and a LED, wherein the driving module comprising a driving TFT, a first switching element, a first capacitor, a second capacitor and a driving control unit.

The gate of the driving TFT is connected to a first node, the source of the driving TFT is connected to a positive voltage output terminal of a power source, and the drain of the driving TFT is connected to the anode of the LED. The cathode of the LED is connected to a negative voltage output terminal of the power source. The first capacitor is located between the first node and the first switching element. The second capacitor is located between the positive voltage output terminal of the power source and the first node. The first switching element is connected between the first capacitor and a data line in series.

The driving control unit comprises a matching TFT whose threshold voltage is matched with the threshold voltage of the driving TFT, is located between the positive voltage output terminal of the power source and the first node, and is configured to control the charging and discharging of the second capacitor so as to hold the threshold voltage of the matching TFT and thereby compensate for the threshold voltage of the driving TFT.

In an example, the driving control unit also comprises a second switching element, wherein the second switching element is connected between the positive voltage output terminal of the power source and a second node in series; and the matching TFT functions as a third switching element and is connected between the first node and the second node in series.

In an example, the circuit also comprises a sensing module comprising a fourth switching element, a fifth switching element, a third capacitor, an amplifying TFT and a sensing element; wherein the fourth switching element is connected between the second node and the gate of the amplifying TFT in series; the fifth switching element is connected between the drain of the amplifying TFT and a sensing line in series; the third capacitor is connected between the gate of the amplifying TFT and a control terminal of the fifth switching element in series; the sensing element is connected to the gate of the amplifying TFT; and the driving control unit controls the charging and discharging of the third capacitor by the sensing module so as to amplify a touch signal in the sensing module through the amplifying TFT in the sensing module.

In an example, all of the switching elements are TFTs. In particular, the first switching element is a first TFT, the second switching element is a second TFT, the third switching element is a third TFT, the fourth switching element is a fourth TFT, and the fifth switching element is a fifth TFT.

In an example, the gate of the first TFT is connected with a scan signal for a current row of pixels, the source of the first TFT is connected to the data line, and the drain of the first TFT is connected to one terminal of the first capacitor; the gate of the second TFT is connected with a control signal for the current row of pixels, the source of the second TFT is connected to the positive voltage output terminal of the power source, and the drain of the second TFT is connected to the source of the third TFT; the gate and the drain of the third TFT are connected to the first node together, the source of the third TFT is connected to the drain of the second TFT; the gate of the fourth TFT is connected with the control signal for the current row of pixels, the source of the fourth TFT is connected to the second node, and the drain of the fourth TFT is connected to the gate of the amplifying TFT; and the gate of the fifth TFT is connected with a control signal for a next row of pixels, the source of the fifth TFT is connected to the drain of the amplifying TFT, and the drain of the fifth TFT is connected to the sensing line.

In an example, the gate of the amplifying TFT is connected to the drain of the fourth TFT, the source of the amplifying TFT is connected with the positive voltage output terminal of the power source, and the drain of the amplifying TFT is connected to the source of the fifth TFT; the third capacitor C3 is connected between the gate of the amplifying TFT and the gate of the fifth TFT to hold the potential at the gate of the amplifying TFT such that the amplifying TFT operates at the amplification region.

In an example, all of the TFTs are P type TFTs.

In an example, all of the above TFTs are poly silicon TFTs or amorphous silicon TFTs or oxide TFTs.

In an example, the sensing element is a sensing electrode which is configured to form induced capacitance between the sensing electrode and a body of a person when the person touches the sensing electrode.

According to another embodiment of the present disclosure, there is provided a display panel comprising a LED pixel unit circuit as described in the above.

The pixel unit circuit provided in the embodiments of the present disclosure comprises the driving module and the LED. The driving module is provided with the driving TFT, the first switching element, the first capacitor, the second capacitor and the driving control unit. The driving current for driving the LED to emit light is made not to be influenced by the threshold voltage of the driving TFT by controlling the charging and discharging of the second capacitor to hold the threshold voltage of the matching TFT equal to the threshold voltage of the driving TFT and compensate for the threshold voltage of the driving TFT thereby. At the same time, the voltage between the two terminals of the second capacitor is the gate-source voltage of the driving TFT, the gate of the driving TFT is at the floating state during operation, the other terminal of the second capacitor is connected to the positive voltage output terminal of the power source, and the potential difference between the two terminals of the second capacitor is not influenced by the internal resistance of the wiring lines. Therefore, the influence of the internal resistance of the wiring lines on the light emitting circuit is eliminated, such that the driving currents for LEDs in the pixel circuit coincide under the same gray-scale voltage, the brightness of the display panel adopting this circuit would not be different, and the brightness uniformity of the display panel is improved.

DETAILED DESCRIPTION

In embodiments of the present disclosure, there are provided a LED pixel unit circuit and a display panel to solve the problem of brightness non-uniformity of the display panel due to different threshold voltages of the TFTs.

In the following, the present disclosure will be described in connection with the figures.

Figure 3:
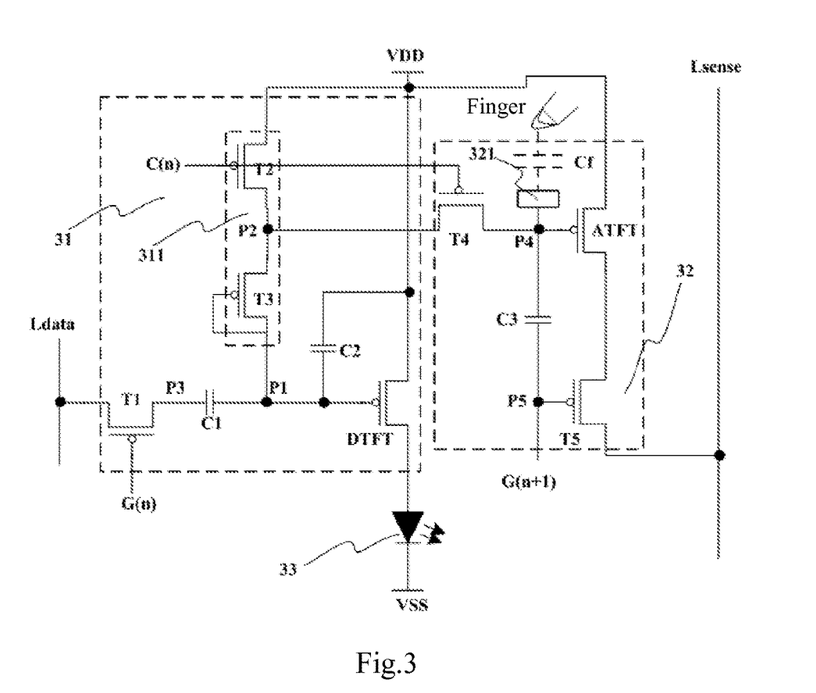
FIG. 3 is a circuit diagram of a pixel driving circuit provided by an embodiment of the present disclosure.

Referring to FIG. 3 which is an AMOLED pixel unit circuit provided by an embodiment of the present disclosure, the AMOLED pixel unit circuit comprises a driving module 31, a sensing module 32 and a LED 33.

In particular, the driving module 31 comprises a driving TFT DTFT, a first TFT T1, a first capacitor C1, a second capacitor C2 and a driving control unit 311, wherein the driving control unit 311 comprises a second TFT T2 and a third TFT T3.

The gate of the driving TFT DTFT is connected to a first node P1, the source of the driving TFT DTFT is connected with a positive voltage VDD output terminal of a power source, and the drain of the driving TFT DTFT is connected to the anode of the AMOLED.

The first capacitor C1 is located between the first node P1 and the first TFT T1. In particular, one terminal of the first capacitor C1 is connected to the first node P1, and the other terminal of the first capacitor C1 is connected to the drain of the first TFT T1.

The second capacitor C2 is located between the positive voltage VDD output terminal of the power source and the first node P1.

The gate of the first TFT T1 is connected with a scan signal G(n) for a current row of pixels, the source of the first TFT T1 is connected to the data line Ldata, and the drain of the first TFT T1 is connected to one terminal of the first capacitor C1.

The gate of the second TFT T2 is connected with a control signal C(n) for the current row of pixels, the source of the second TFT T2 is connected to the positive voltage VDD output terminal of the power source, and the drain of the second TFT T2 is connected to the source of the third TFT T3.

The gate and the drain of the third TFT T3 are connected to the first node P1 together, and the source of the third TFT T3 is connected to the drain of the second TFT T2.

The sensing module 32 comprises a third capacitor C3, an amplifying TFT ATFT, a sensing electrode 321, a fourth TFT T4 and a fifth TFT T5.

The gate of the fourth TFT T4 is connected with the control signal C(n) for the current row of pixels, the source of the fourth TFT T4 is connected to the second node P2, and the drain of the fourth TFT T4 is connected to the gate of the amplifying TFT ATFT.

The gate of the fifth TFT T5 is connected with a control signal G(n+1) for a next row of pixels, the source of the fifth TFT T5 is connected to the drain of the amplifying TFT ATFT, and the drain of the fifth TFT T5 is connected to a sensing line Lsense.

The gate of the amplifying TFT ATFT is connected to the drain of the fourth TFT, the source of the amplifying TFT ATFT is connected to the positive voltage VDD output terminal of the power source, and the drain of the amplifying TFT ATFT is connected to the source of the fifth TFT.

The third capacitor C3 is connected between the gate of the amplifying TFT ATFT and the gate of the fifth TFT.

The sensing electrode 321 is connected to the gate of the amplifying TFT ATFT, and is configured to form induced capacitance Cf between the sensing electrode 321 and a body of a person when the person touches the sensing electrode 321, so as to cause change in the potential of the gate of the ATFT and thus generate changed sensing current.

In addition, the anode of the AMOLED is connected to the drain of the driving TFT DTFT, and the cathode of the AMOLED is connected with the negative voltage VSS output terminal of the power source.

Figure 4:
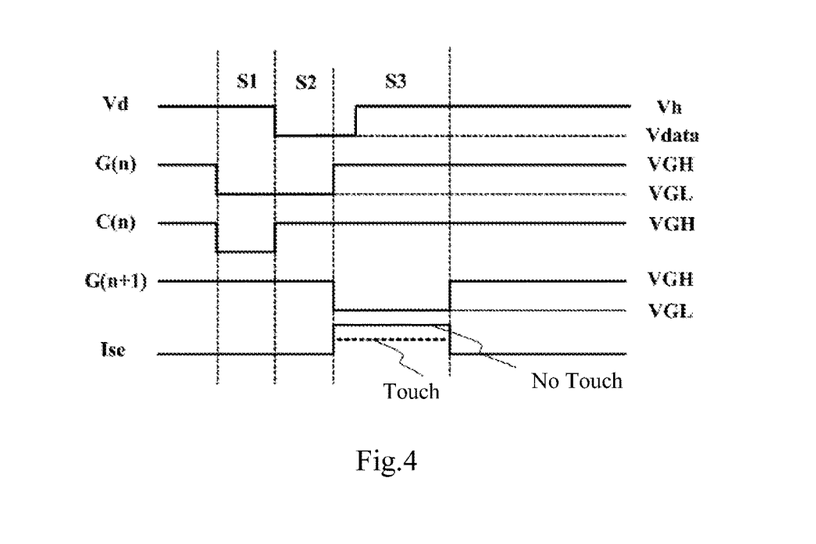
FIG. 4 is a timing diagram of signals at respective signal terminals of the pixel driving circuit provided by the embodiment of the present disclosure.

FIG. 4 is a timing diagram of signals at respective signal terminals. Next, the operation method of an AMOLED pixel unit circuit provided by an embodiment of the present disclosure will be described in connection with FIG. 4, in which all of the TFTs are turned on by a low level and turned off by a high level.

Figure 5:
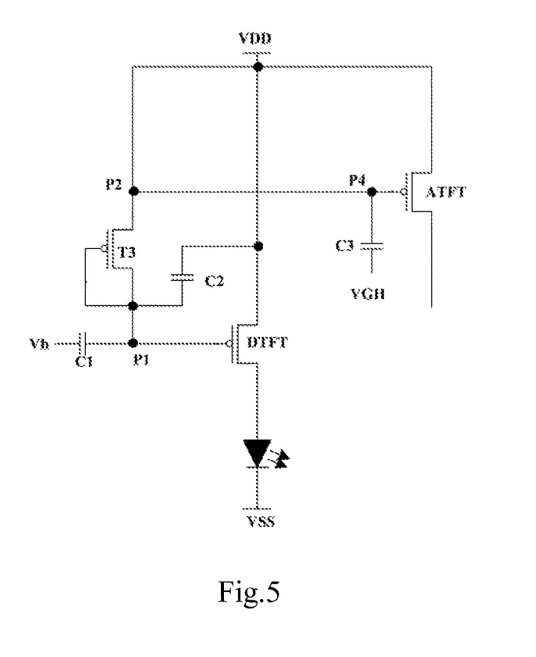
FIG. 5 is an equivalent circuit diagram of the pixel driving circuit provided by the embodiment of the present disclosure at a first stage.

A first stage S1, referring to FIG. 5 which is an equivalent circuit diagram at this stage, the scan signal G(n+1) for the next row of pixels is at a high level VGH, such that the fifth TFT T5 responding to the scan signal G(n+1) for the next row of pixels is turned off, and thus the drain of the amplifying TFT ATFT is at a floating state.

The scan signal G(n) for the current row of pixels is at a low level VGL, and the control signal C(n) for the current row of pixels is at the low level VGL. Therefore, the first TFT T1, the second TFT T2, the third TFT T3 and the fourth TFT T4 are turned on. The gray-scale voltage signal Vd output from the data line Ldata has a gray-scale voltage of Vh, and charges the first capacitor C1 to raise the potential of the third node P3 at one terminal of the capacitor C1 which is close to the first TFT T1 to Vh. At the same time, the positive voltage VDD of the power source charges the second capacitor C2 through the second TFT T2 and the third TFT T3 until the potential at the other terminal (i.e., at the first node P1) of the second capacitor C2 is raised to VDD−|Vth3|, the third TFT T3 is turned off, and the positive voltage VDD of the power source does not continue to charge the second capacitor C2 any more, where Vth3 is the threshold voltage of the third TFT T3. Therefore, the voltage between the two terminals of the first capacitor C1 is:

$$Vc_1 = VDD - |Vth3| - Vh$$

where $Vc_1$ is the voltage between the two terminals of the first capacitor C1, and Vth3 is the threshold voltage of the third TFT T3.

At the same time, the positive voltage VDD of the power source charges the third capacitor C3 to raise the potential at one terminal (i.e., at the fourth node P4) of the third capacitor C3 which is close to the amplifying TFT ATFT to VDD. The potential at the other terminal (i.e., at the fifth node P5) of the third capacitor C3 is raised to VGH. Therefore, the voltage between the two terminals of the third capacitor C3 is:

$$Vc_3 = VDD - VGH,$$

where $Vc_3$ is the voltage between the two terminals of the third capacitor C3.

Figure 6:
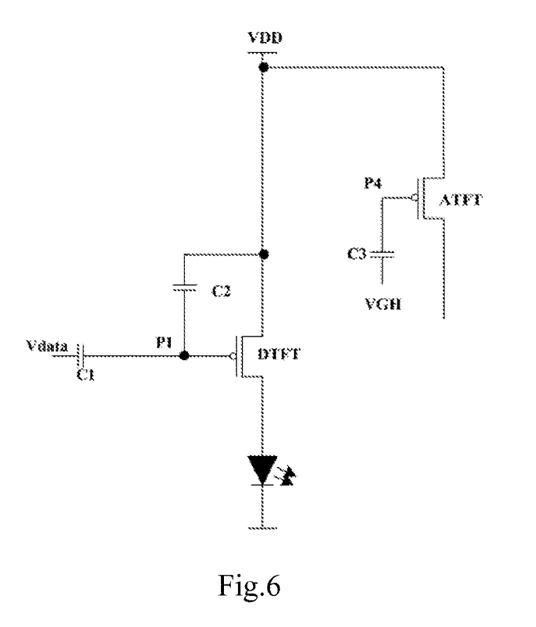
FIG. 6 is an equivalent circuit diagram of the pixel driving circuit provided by the embodiment of the present disclosure at a second stage.

At a second stage S2, referring to FIG. 6 which is an equivalent circuit diagram at this stage, G(n) remains at the low level, and G(n+1) remains at the high level. Therefore, the first TFT T1 is at the turning-on state, and the fifth TFT is still at the turning-off state. C(n) jumps to the high level, the second TFT T2 and the fourth TFT T4 are turned off, and the third TFT T3 remains at the turning-off state. Since the second TFT T2, the fourth TFT T4 and the third TFT T3 are turned off, the gate of the driving TFT DTFT is at the floating state. At the same time, the voltage at the data line jumps from the high voltage Vh to the low level Vdata, and the potential at the first node P1 changes accordingly due to the coupling function of the first capacitor C1. At this time, the potential at the gate of the driving TFT DTFT is:

$$Vp1 = VDD - |Vth3| + (Vdata - Vh)*C1/(C1+C2),$$

where Vp1 is the potential at the gate of the driving TFT DTFT.

In this circuit, the third TFT T3 is very close to the driving TFT DTFT in position, and their process environments are also very similar. Therefore, they have very small difference in electric characteristics caused by the process. Their electric characteristics can be regarded approximately the same. In other words, the threshold voltage Vth3 of the third TFT T3 is the same as the threshold voltage Vthd of the driving TFT DTFT. The third TFT T3 can be used as a matching transistor of the driving TFT DTFT to compensate for the threshold voltage Vthd of the driving TFT DTFT together with the second capacitor C2 and thus eliminate the influence of the threshold voltage of the driving TFT DTFT on the driving current.

Therefore, the potential Vp1 at the gate of the driving TFT DTFT is:

$$Vp1 = VDD - |Vthd| + (Vdata - Vh)*C1/(C1+C2),$$

where Vthd is the threshold voltage of the driving TFT DTFT.

Figure 7:
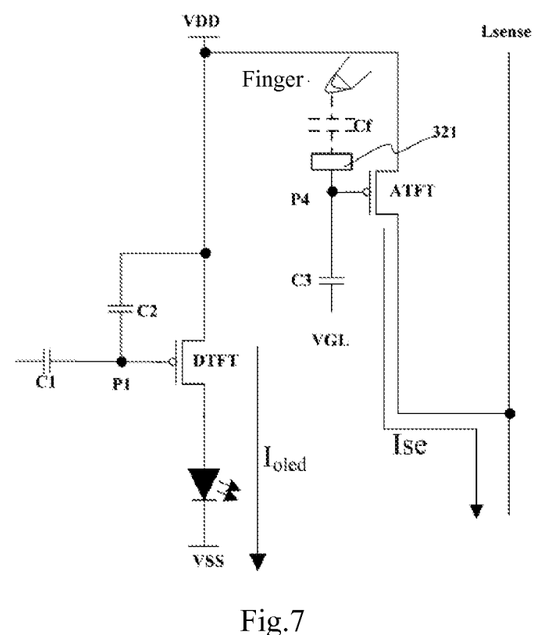
FIG. 7 is an equivalent circuit diagram of the pixel driving circuit provided by the embodiment of the present disclosure at a third stage.

At a third stage S3, referring to FIG. 7 which is an equivalent circuit diagram at this stage, G(n) jumps to the high level VGH, and the first TFT T1 is turned off. C(n) remains at the high level, the second TFT T2, the fourth TFT T4 and the third TFT T3 are turned off, and the gate of the driving TFT DTFT is still at the floating state, and its potential remains unchanged. At this time, the voltage between the gate and the source of the driving TFT DTFT is:

$$\begin{aligned} Vsg &= Vs - Vp1 \\ &= VDD - [VDD - |Vthd| + (Vdata - Vh)*C1/(C1+C2)] \\ &= (Vh - Vdata)*C1/(C1+C2) + |Vthd| \end{aligned}$$

where Vsg is the voltage between the gate and the source of the driving TFT DTFT, Vs is the potential at the source of the driving TFT DTFT, and Vp1 is the potential at the gate of the driving TFT DTFT.

Therefore, the saturation current through the driving TFT DTFT, i.e. the light emitting current $I_{oled}$ of the AMOLED, is:

$$\begin{aligned} I_{oled} &= kd(Vsg - |Vthd|)^2 \\ &= kd[(Vh - Vdata)*C1/(C1+C2) + |Vthd| - |Vthd|]^2 \\ &= kd[(Vh - Vdata)*C1/(C1+C2)]^2 \end{aligned}$$

where Kd is a constant related to the process and driving design.

G(n+1) jumps to the low level VGL to turn on the fifth TFT T5. Since the fourth TFT T4 is turned off, the gate of the amplifying TFT AFTF is floating. Therefore, when the potential of G(n+1) jumps to the low level, the potential at the fourth node P4, i.e. the gate potential of the amplifying TFT ATFT, follows to jump down due to the coupling function of the third capacitor C3. The amplitude of change in the gate potential of the amplifying TFT ATFT is related to whether touch action occurs on the sensing electrode 321 connected to the gate of the amplifying TFT ATFT.

When touch action occurs on the sensing electrode 321, since coupling capacitance Cf would be formed between the body of the person and the sensing electrode 321, the potential Vp4 at the fourth node P4 is:

$$Vp4=VDD+(VGL-VGH)*C3/(C3+Cf).$$

Now the voltage $V_1sg$ between the source and the gate of the amplifying TFT ATFT is:

$$\begin{aligned} V_1sg &= Vs - Vg \\ &= Vs - Vp4 \\ &= VDD - [VDD + (VGL - VGH)*C3/(C3+Cf)] \\ &= (VGH - VGL)*C3/(C3+Cf). \end{aligned}$$

Accordingly, the sensing current Ise through the sensing line Lsense now is:

$$\begin{aligned} Ise &= Ka(Vsg - |Vtha|)^2 \\ &= Ka(V_1sg - |Vtha|)^2 \\ &= Ka[(VGH - VGL)*C3/(C3+Cf) - |Vtha|]^2, \end{aligned}$$

where Vtha is the threshold voltage of the amplifying TFT, and Ka is a constant of the amplifying TFT related to the process and design.

When no touch action occurs on the sensing electrode 321, the potential at the fourth node P4 is:

$$Vp4=VDD-(VGH-VGL).$$

Now, the voltage $V_2sg$ between the source and the gate of the amplifying TFT ATFT is:

$$\begin{aligned} V_2sg &= Vs - Vg \\ &= Vs - Vp4 \\ &= VDD - [VDD - (VGH - VGL)] \\ &= VGH - VGL. \end{aligned}$$

Accordingly, the sensing current Ise through the sensing line Lsense now is:

$$\begin{aligned} Ise &= Ka(Vsg - |Vtha|)^2 \\ &= Ka(V_2sg - |Vtha|)^2 \\ &= Ka[(VGH - VGL) - |Vtha|]^2. \end{aligned}$$

In conclusion, when touch action occurs, the voltage between the source and the gate of the amplifying TFT ATFT decreases due to the voltage distribution effect of the coupling capacitance Cf, and the amplification capability of the amplifying TFT ATFT decreases, such that the sensing current Ise generated when touch action occurs is smaller than the sensing current Ise generated when no touch action occurs. Therefore, in the circuit, it is possible to determine whether touch action occurs at the present location only according to the sensing current.

According to another embodiment of the present disclosure, there is also provided a display panel comprising an AMOLED pixel unit circuit as described in the above.

In conclusion, the AMOLED pixel unit circuit provided by the embodiment of the present disclosure comprises the driving module and the LED. The driving module is provided with the driving TFT, the first TFT, the second TFT, the third TFT, the first capacitor and the second capacitor. The driving current for driving the LED to emit light is made not to be influenced by the threshold voltage of the driving TFT by controlling the charging and discharging of the second capacitor to hold the threshold voltage of the matching TFT equal to the threshold voltage of the driving TFT and compensate for the threshold voltage of the driving TFT thereby. At the same time, the voltage between the two terminals of the second capacitor is the gate-source voltage of the driving TFT, the gate of the driving TFT is at the floating state during operation, the other terminal of the second capacitor is connected to the positive voltage output terminal of the power source, and the potential difference between the two terminals of the second capacitor is not influenced by the internal resistance of the wiring lines. Therefore, the influence of the internal resistance of the wiring lines on the light emitting circuit is eliminated, such that the driving currents for AMOLEDs in the pixel circuit coincide under the same gray-scale voltage, the brightness of the display panel adopting this circuit would not be different, and the brightness uniformity of the display panel is improved. Further, in the present disclosure, the sensing module is integrated in the circuit, the control signal in the driving module, the second TFT responding to the control signal and the scan signal of the current row of pixels are reused to charge the third capacitor, and the finger touch signal is amplified by the amplifying TFT through the coupling of the finger touch. The touch function of the display panel is well realized without increasing the complexity of the circuit structure and operation. In addition, in the circuit, only P type TFTs are used, thereby reducing the complexity and cost of the fabrication process.

It is noted that although description is made by taking an example of only using P type TFTs in the above embodiments, the above circuit can be easily changed to a circuit only using N type TFTs or CMOS transistors. In addition, the touch function part can be removed to change the pixel unit circuit as a pure pixel light-emitting driving circuit. Further, although description is made by taking the AMOLED as an example in the above embodiments, the present disclosure is not limited to the display apparatus using AMOLEDs, but can be applied to display apparatus using other various LEDs.

Obviously, those skilled in the art may make various modifications and variations without departing from the spirit and scope of the present disclosure. The present disclosure is also intended to contain those modifications and variations as long as those modifications and variations of the present disclosure fall within the scope of the claims and equivalents thereof of the present disclosure.

What is claimed is:

1. An LED pixel unit circuit comprising a driving module and an LED, the driving module comprising a driving TFT, a first switching element, a first capacitor, a second capacitor and a driving control unit, wherein the LED is located between the drain of the driving TFT and a negative voltage output terminal of a power source, the anode of the LED is connected to the drain of the driving TFT and the cathode of the LED is connected to the negative voltage output terminal of the power source;

the gate of the driving TFT is connected to a first node, and the source of the driving TFT is connected to a positive voltage output terminal of the power source;

the first capacitor is located between the first node and the first switching element;

a first terminal of the second capacitor is connected to the positive voltage output terminal of the power source, and a second terminal of the second capacitor is connected to the first node;

the first switching element is connected between the first capacitor and a data line, in series; and the driving control unit comprises a matching TFT whose threshold voltage is matched with the threshold voltage of the driving TFT, and a first terminal of the driving control unit together with the first terminal of the second capacitor are connected to the positive voltage output terminal of the power source and to the source of the driving TFT, a second terminal of the driving control unit together with the second terminal of the second capacitor are connected to the first node and to the gate of the driving TFT, such that the driving control unit is connected with the second capacitor in parallel between the positive voltage output terminal of the power source and the first node, and is configured to control charging and discharging of the second capacitor so as to hold the threshold voltage of the matching TFT and thereby compensate for the threshold voltage of the driving TFT.

2. The circuit of claim 1, wherein the driving control unit also comprises a second switching element, the second switching element is connected between the positive voltage output terminal of the power source and a second node in series; and the matching TFT functions as a third switching element and is connected between the first node and the second node in series.

3. The circuit of claim 2, wherein the circuit also comprises a sensing module comprising a fourth switching element, a fifth switching element, a third capacitor, an amplifying TFT and a sensing element;

the fourth switching element is connected between the second node and the gate of the amplifying TFT in series;

the fifth switching element is connected between the drain of the amplifying TFT and a sensing line in series;

the third capacitor is connected between the gate of the amplifying TFT and a control terminal of the fifth switching element in series;

the sensing element is connected to the gate of the amplifying TFT; and the driving control unit controls charging and discharging of the third capacitor by the sensing module so as to amplify a touch signal in the sensing module through the amplifying TFT in the sensing module.

4. The circuit of claim 3, wherein the first switching element to the fifth switching element are a first TFT to a fifth TFT respectively.

5. The circuit of claim 4, wherein a gate of the first TFT is connected with a scan signal for a current row of pixels, a source of the first TFT is connected to the data line, and a drain of the first TFT is connected to one terminal of the first capacitor;

a gate of the second TFT is connected with a control signal for the current row of pixels, a source of the second TFT is connected to the positive voltage output terminal of the power source, and a drain of the second TFT is connected to a source of the third TFT; and a gate and a drain of the third TFT are connected to the first node together, the source of the third TFT is connected to the drain of the second TFT.

6. The circuit of claim 5, wherein a gate of the fourth TFT is connected with a control signal for a current row of pixels, a source of the fourth TFT is connected to the second node, and a drain of the fourth TFT is connected to a gate of the amplifying TFT;

a gate of the fifth TFT is connected with a control signal for a next row of pixels, a source of the fifth TFT is connected to a drain of the amplifying TFT, and a drain of the fifth TFT is connected to the sensing line; and the gate of the amplifying TFT is connected to the drain of the fourth TFT, a source of the amplifying TFT is connected with the positive voltage of the power source, and the drain of the amplifying TFT is connected to the source of the fifth TFT.

7. The circuit of claim 4, wherein all of the TFTs are P type TFTs.

8. The circuit of claim 3, wherein the sensing element is a sensing electrode, and is configured to form induced capacitance between the sensing electrode and a body of a person when the person touches the sensing electrode.

9. The circuit of claim 4, wherein the third TFT is the same as the driving TFT in terms of size and shape.

10. A display panel comprising the LED pixel unit circuit according to claim 1.

11. The display panel of claim 10, wherein the driving control unit also comprises a second switching element, the second switching element is connected between the positive voltage output terminal of the power source and a second node in series; and the matching TFT functions as a third switching element and is connected between the first node and the second node in series.

12. The display panel of claim 11, wherein the circuit also comprises a sensing module comprising a fourth switching element, a fifth switching element, a third capacitor, an amplifying TFT and a sensing element;

the fourth switching element is connected between the second node and the gate of the amplifying TFT in series;

the fifth switching element is connected between the drain of the amplifying TFT and a sensing line in series;

the third capacitor is connected between the gate of the amplifying TFT and a control terminal of the fifth switching element in series;

the sensing element is connected to the gate of the amplifying TFT; and the driving control unit controls charging and discharging of the third capacitor by the sensing module so as to amplify a touch signal in the sensing module through the amplifying TFT in the sensing module.

13. The display panel of claim 12, wherein the first switching element to the fifth switching element are a first TFT to a fifth TFT respectively.

14. The display panel of claim 13, wherein a gate of the first TFT is connected with a scan signal for a current row of pixels, a source of the first TFT is connected to the data line, and a drain of the first TFT is connected to one terminal of the first capacitor;

a gate of the second TFT is connected with a control signal for the current row of pixels, a source of the second TFT is connected to the positive voltage output terminal of the power source, and a drain of the second TFT is connected to a source of the third TFT; and a gate and a drain of the third TFT are connected to the first node together, the source of the third TFT is connected to the drain of the second TFT.

15. The display panel of claim 14, wherein a gate of the fourth TFT is connected with a control signal for a current row of pixels, a source of the fourth TFT is connected to the second node, and a drain of the fourth TFT is connected to a gate of the amplifying TFT;

a gate of the fifth TFT is connected with a control signal for a next row of pixels, a source of the fifth TFT is connected to a drain of the amplifying TFT, and a drain of the fifth TFT is connected to the sensing line; and the gate of the amplifying TFT is connected to the drain of the fourth TFT, a source of the amplifying TFT is connected with the positive voltage of the power source, and the drain of the amplifying TFT is connected to the source of the fifth TFT.

16. The display panel of claim 13, wherein all of the TFTs are P type TFTs.

17. The display panel of claim 12, wherein the sensing element is a sensing electrode, and is configured to form induced capacitance between the sensing electrode and a body of a person when the person touches the sensing electrode.

18. The display panel of claim 13, wherein the third TFT is the same as the driving TFT in terms of size and shape.

* * * * *